Aug. 17, 1937. B. LIEBOWITZ 2,090,369
APPARATUS FOR PROCESSING COLLARS OR OTHER ARTICLES OF APPAREL
Filed Nov. 30, 1934 7 Sheets-Sheet 5
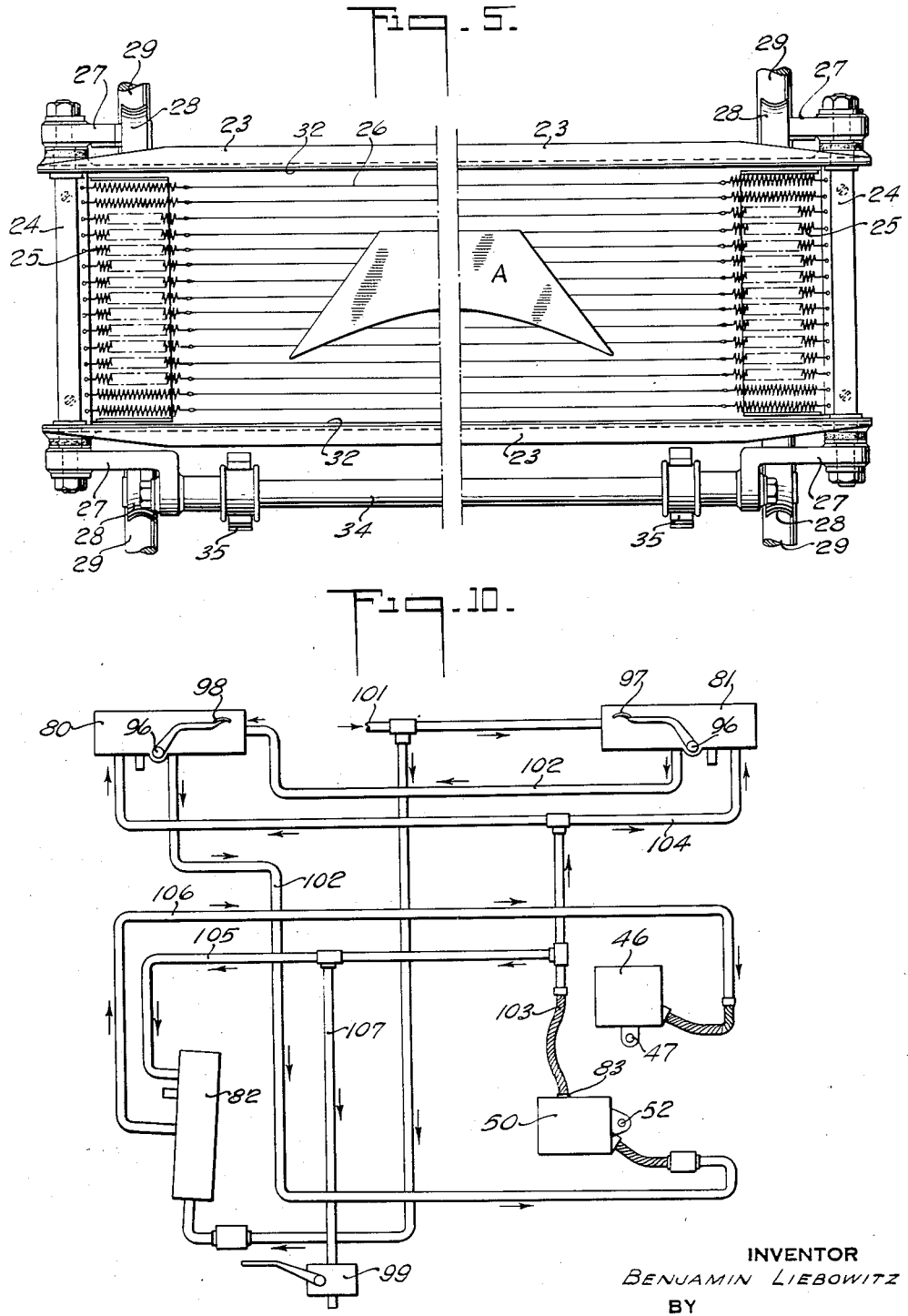
INVENTOR
BENJAMIN LIEBOWITZ.
BY
ATTORNEY

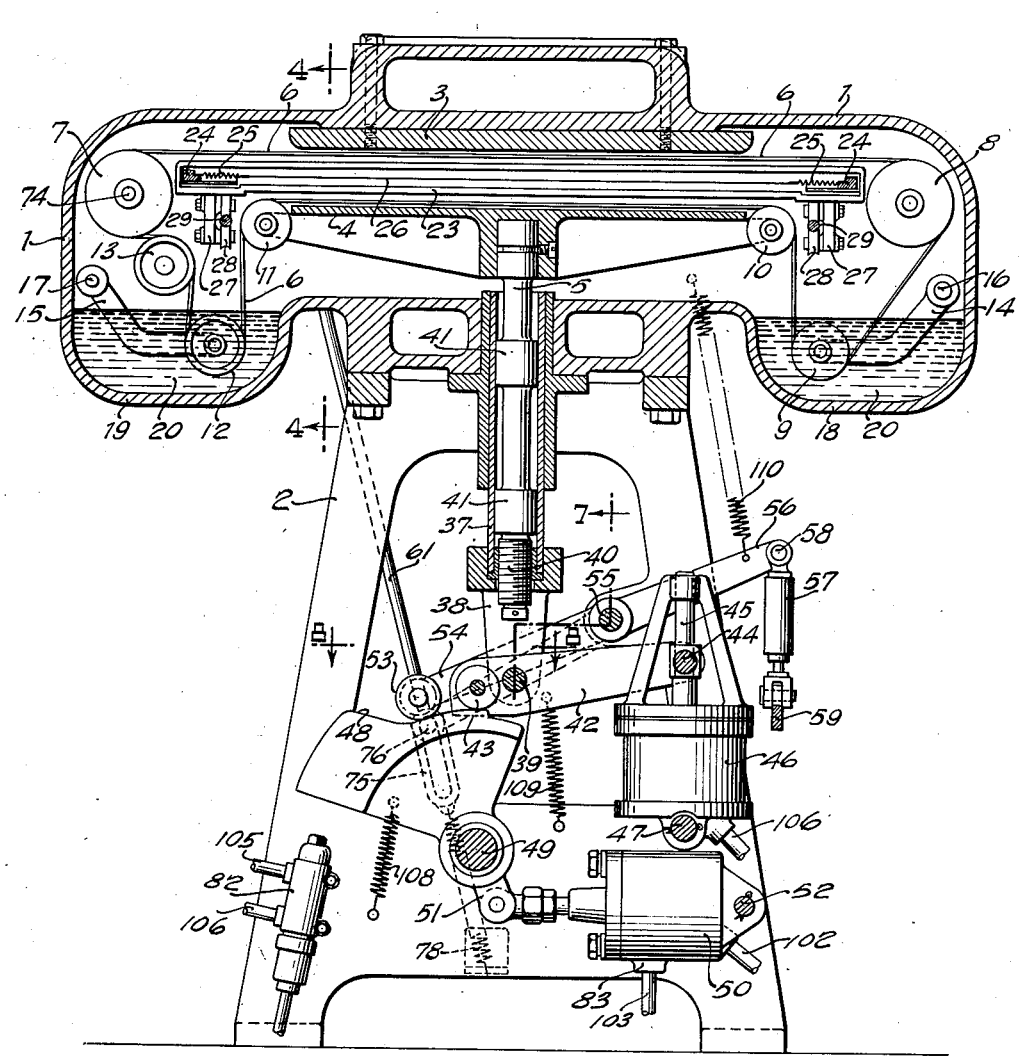

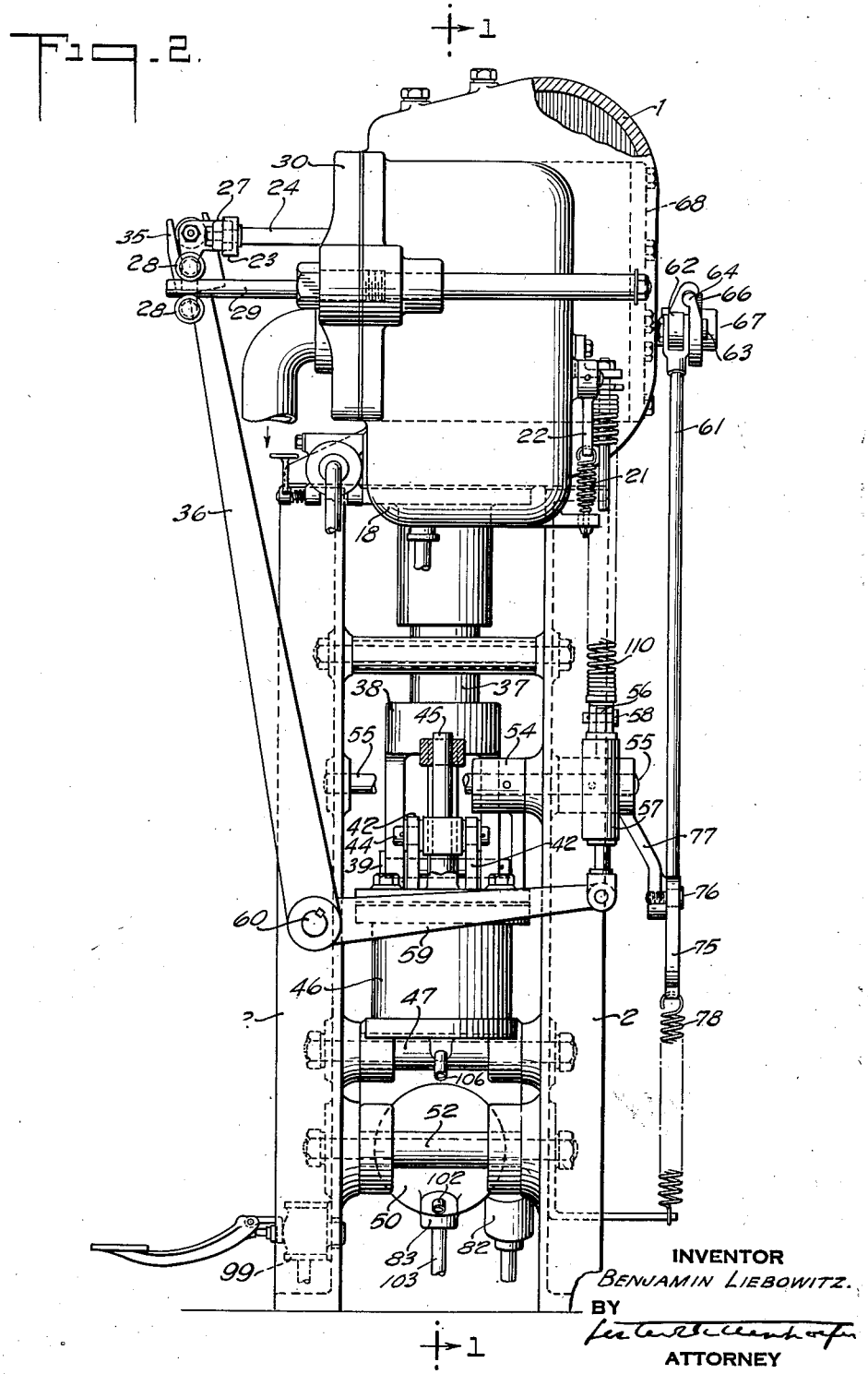

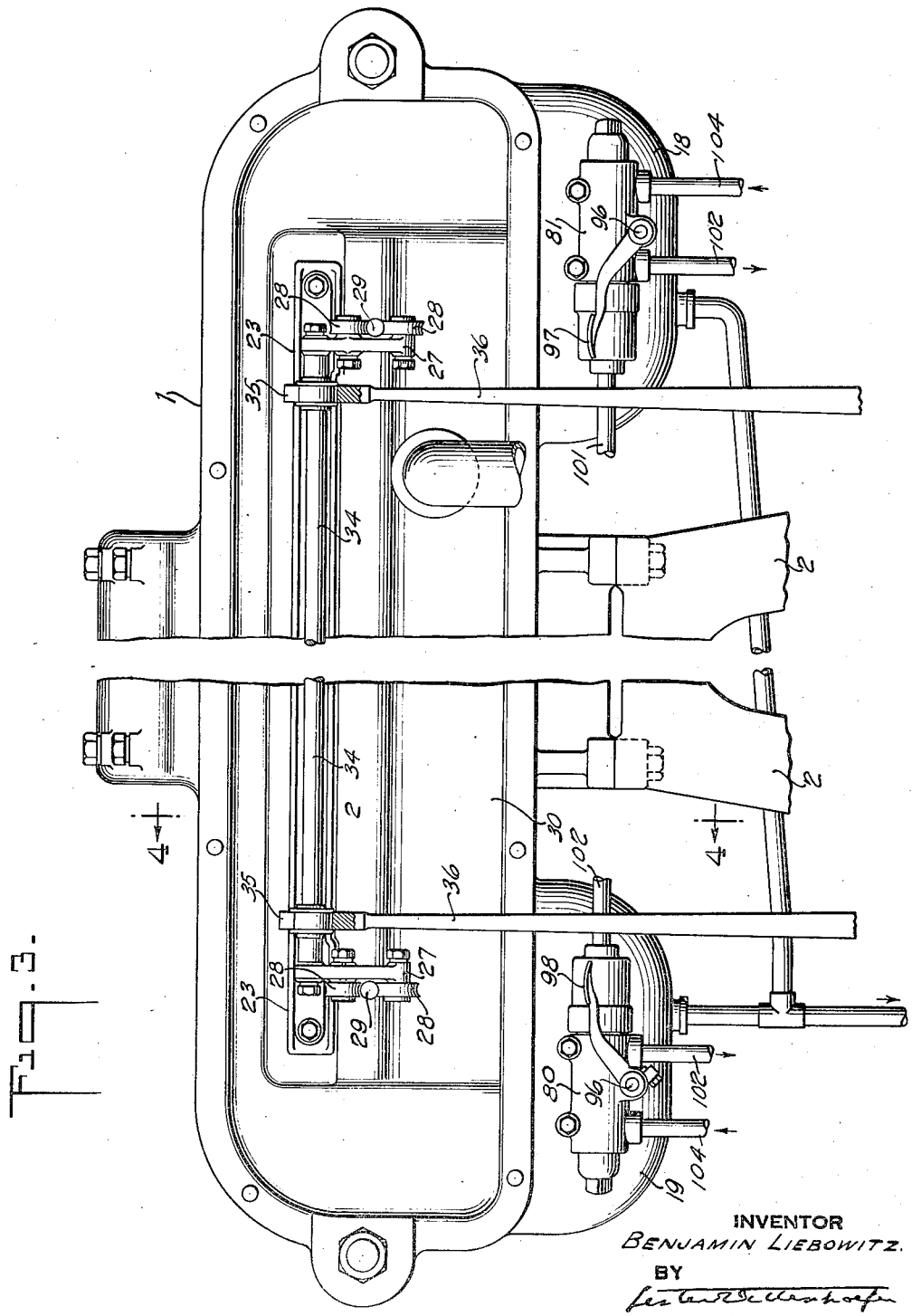

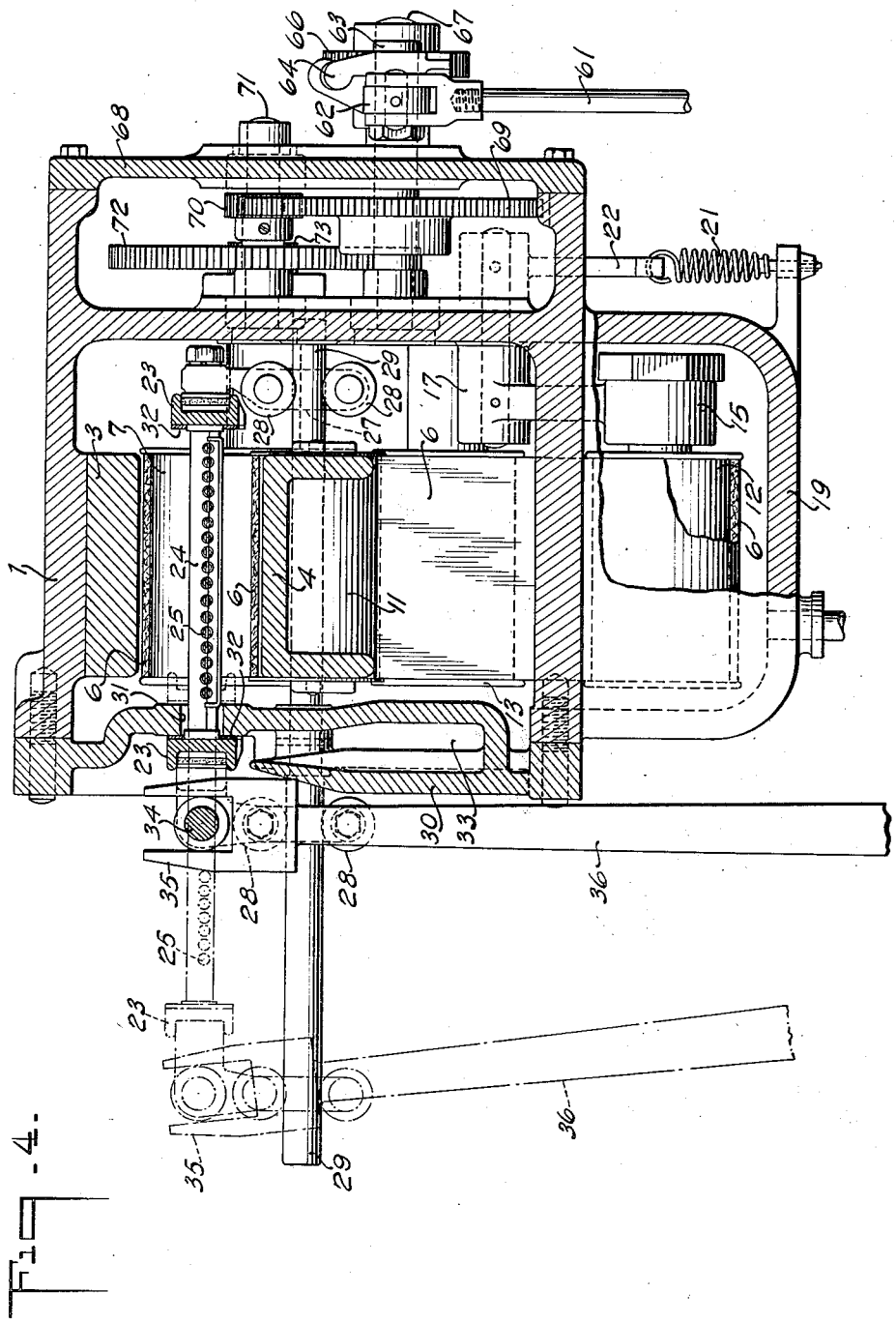

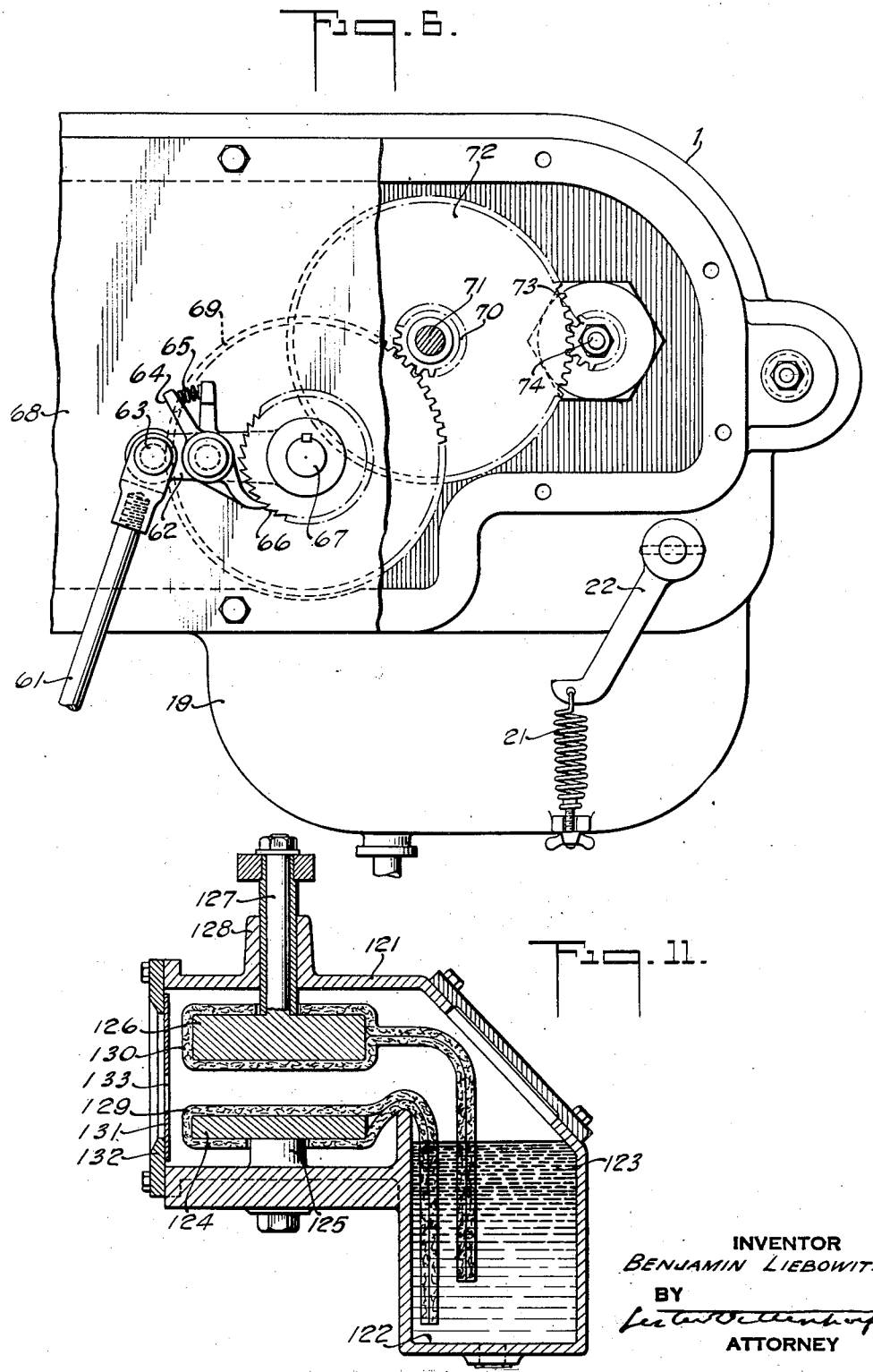

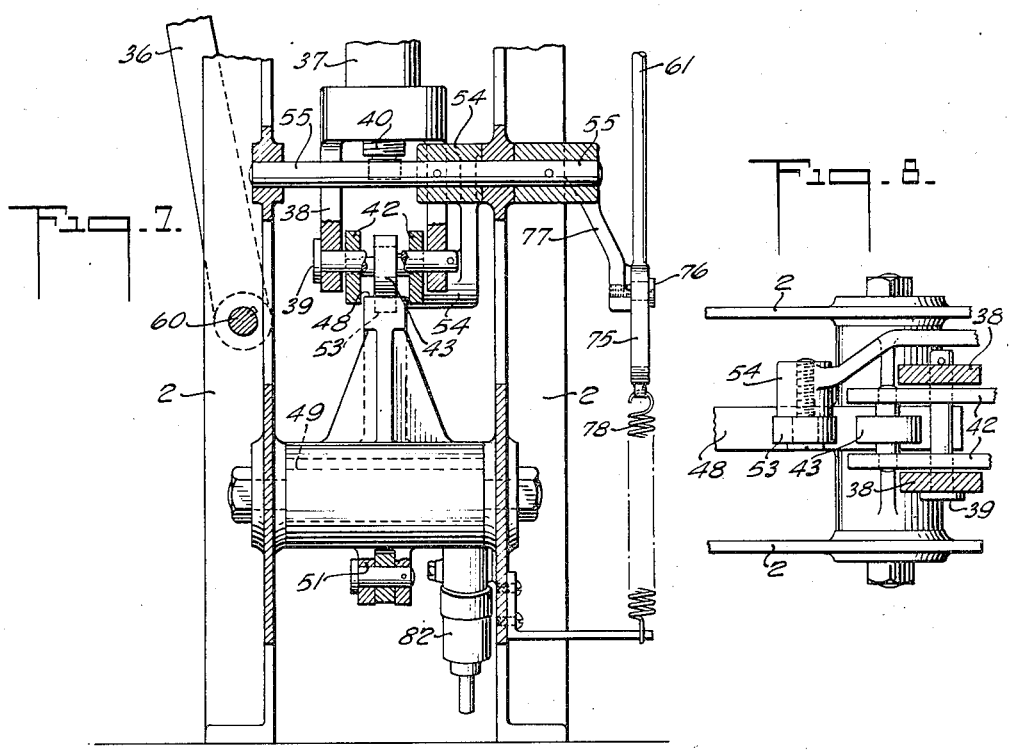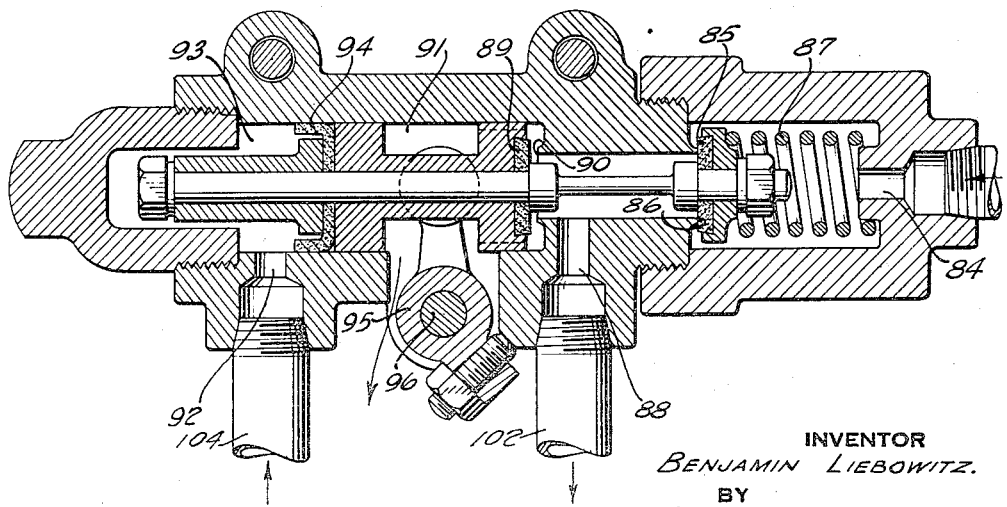

Patented Aug. 17, 1937

2,090,369

UNITED STATES PATENT OFFICE 2,090,369

APPARATUS FOR PROCESSING COLLARS OR OTHER ARTICLES OF APPAREL

Benjamin Liebowitz, New York, N. Y., assignor to Trubenizing Process Corporation, New York, N. Y., a corporation of New York Application November 30, 1934, Serial No. 755,276

7 Claims. (Cl. 154—1)

This invention relates to apparatus for processing collars or other articles of apparel comprising a plurality of plies which are adhesively united by means of an adhesive material such as cellulose acetate, and more particularly such articles of apparel where the adhesion is obtained by means of cellulose derivative yarns between the plies to be adhesively united.

In my experiments on articles of apparel of this kind, in which the garment parts are first fabricated with a lining having cellulose derivative yarns associated therewith, and in which the adhesive material is rendered adhesive by the application of a solvent to the external surfaces of the garment part, I have found that a pronounced improvement in adhesion is obtained when the garment part is subjected to mechanical pressure while it is wet with solvent. Preferably, the pressure is applied at the time that the solvent is applied. Furthermore, by the application of pressure simultaneous with the application of solvent, the amount of solvent which the garment part takes up may be regulated in a simple manner, as will be explained later.

A primary object of this invention is to provide method and apparatus for the simultaneous application of solvent and mechanical pressure to such garment parts. A second object is to provide means for regulating the amount of solvent taken up by the garment part. A third object is to provide a mechanism wherein these other objects can be readily achieved, and furthermore, to provide a mechanism wherein the operations can be performed with maximum output and minimum effort for factory purposes. A fourth object is to provide a machine which will enclose the solvents used and which will provide for a minimum of escape of the vapors of such solvents into the atmosphere. A further object is to provide a suitable mechanism for quickly introducing the garment parts into the machine and likewise withdrawing the garment parts upon completion of the operation, with a minimum of escape of the vapors of the solvent. Another object is to provide a machine which will function quickly and reliably under factory conditions.

These, as well as other, objects are attained by means of the mechanism hereinafter described and illustrated in the accompanying drawings, in which:—

Fig. 1 is a vertical cross-section of the machine taken on the line 1—1 of Fig. 2;

Fig. 2 is a side elevation of the machine;

Fig. 3 is a front elevation of the head of the machine;

Fig. 4 is an enlarged vertical cross-section of the head taken on the line 4—4 of Fig. 3, showing the tray mechanism in its "in" position in full lines, and in its "out" position in dot-and-dash lines;

Fig. 5 is a top plan view of a tray mechanism for inserting the collar into the machine;

Fig. 6 is a fragmentary rear view, with cover broken away, showing the ratchet drive for the belt mechanism;

Fig. 7 is a fragmentary vertical cross-section on the line 7—7 of Figure 1;

Fig. 8 is a fragmentary horizontal cross-section on the line 8—8 of Figure 1;

Fig. 9 is a vertical cross-section through the center line of one of the operating valves;

Fig. 10 is a diagrammatic view of the piping layout for the compressed air lines; and Fig. 11 is a cross-sectional diagrammatic view showing a modified construction of the head of the machine.

Referring to Figs. 1 to 10, I represents a hollow casting which comprises the head of the machine and which is supported by a pair of A-shaped frame members 2. Bolted to the inner top surface of the casting I is a plate 3 which constitutes the upper platen of the machine. 4 is a casting which is carried on the rod 5 and forms the lower platen of the machine. 6 is an endless belt of cotton or other suitable material, whose thickness is a factor in the amount of moisture delivered to the work as will be subsequently described. The belt 6 runs over the driving pulley 7, and pulleys 8, 9, 10, 11, 12 and 13. Two pulleys 10 and 11 are carried on the lower platen 4 and ride up and down with said platen. The two pulleys 9 and 12 are carried on swinging arms 14 and 15 and are pivoted at 16 and 17, thereby permitting the belt to rise and fall with the lower platen 4. The pulleys 9 and 12, furthermore, dip into wells 18 and 19 which are formed in the bottom of the head 1 of the machine. These wells contain the liquid solvent 20, so that as the belt moves it picks up the solvent. With each stroke of the machine, the belt is moved a sufficient distance so as to bring freshly wetted portions of the belt between the platens 3 and 4. The belt 6 is maintained under tension by means of springs 21 operating through levers 22 on each of the arms 14 and 15. It will be observed that the upper horizontal portion of the belt 6 travels very close to the upper platen 3, while the lower horizontal portion of the belt is positioned by the pulleys 10 and 11 so as to travel very close to the upper surface of the lower platen 4. Between the upper and lower horizontal portions of the belt is a clear space for the movement of the tray mechanism which carries the work.

The tray mechanism comprises a frame work consisting of two parallel horizontal bars 23 connected together substantially at their ends by the cross pieces 24. Affixed to each cross piece 24 is a series of small springs 25, which serve to keep under tension a group of threads or yarns 26 which may be of any suitable material such as cotton, silk, linen, or even of metal, as, for example, fine piano wire. Upon the work-support provided by the threads 26 the work to be treated is laid. The object of this construction is to provide a work-support containing the minimum possible amount of material and which will at the same time permit free access of the solvent to the work from underneath. It should be borne in mind that in a machine of this kind there must be no material obstruction of the passage of solvent from the belt into the work, and likewise, that the amount of solvent carried out into the air with each stroke of the machine, when the work is carried out of the machine, must also be a minimum. Both of these objects, that is, minimum obstruction to the passage of solvent into the work, and minimum amount of solvent carried into the air with each operation of the machine, are achieved by having a spring tensioned work-support with large open spaces and with a minimum amount of absorbent material to pick up solvent and carry same into the atmosphere.

The springs 25 perform two important functions:—first, in maintaining the threads 26 under suitable tension; and, second, in providing the necessary stretch to allow for the upward movement of the lower platen 4. When the lower platen is in its down position, the position of the threads 26 is, as shown in Figure 1, approximately midway between the upper platen 3 and the lower platen 4. But when the lower platen 4 is in its upper position, the threads 26 are pressed upwardly against the upper platen, because of the pressure due to the lower platen. Since the frame 23—24 does not move vertically and since the springs 25 are anchored to this frame, a considerable stretch in the springs 25 must take place to allow for the movement of the threads 26.

It should be noted that the frame 23—24 is so constructed as to permit the lower platen 4 to move vertically upward through it without touching either the frame 23—24 or the springs 25.

Since the tray mechanism serves to introduce the work into the machine and likewise to take it out, it must be mounted so as to travel in and out of the machine. For this purpose the frame is mounted on four carriages 27, one at each corner, each provided with two rollers 28 which ride on the two rods 29. The front of the machine is closed by means of a cover 30 which is provided with a slot 31 to allow for the passage of the tray mechanism into the machine and out. It will be seen, on referring to Fig. 4, that the slot 31 is covered on the outside by one of the side members 23 when the tray mechanism is in its "in" position; likewise, when the tray mechanism is in its "out" position (shown by dot-and-dash lines), the other side member 23 closes the slot from the inside. To insure a closure of the slot against the escape of vapors, the side members 23 are faced with a soft backing material as indicated at 32.

The front cover 30 is provided with an air duct 33 which runs parallel to and is immediately under the slot 31. This duct is connected to an exhaust blower (not shown) which serves to carry out of the room any vapors that may escape.

It will be observed that two of the carriages and their associated rollers are always inside the head and two of them always outside. The two external carriages are cross-connected by a bar 34 which engages the forked ends 35 of the two levers 36. The operation of these levers 36 will be described presently.

The rod 5 which carries the lower platen 4 is supported, as shown in Figure 1, in a tube 37 which carries at its lower end a fork 38 which is supported by the pin 39. The lower end of the rod 5 is threaded at 40 to permit of vertical adjustment of the lower platen 4. The rod 5 is turned down to a reduced diameter for the major portion of its length and contacts with the tube only at the portions 41 having enlarged diameter. This is to allow a small flexure of the rod 5 so that the lower platen 4 can adjust itself to the upper platen 3 in the event of small errors in machining. The pin 39 is carried by the lever 42, at one end of which is mounted the cam roller 43. At the end of the long arm of the lever 42 is the pivoted connection 44 to the piston rod 45 of the air cylinder 46 which is pivoted at 47. The cam roller 43 rests on the surface of the cam 48, which cam is freely mounted on the shaft 49 and actuated by the air cylinder 50 through the short lever 51 attached to the cam 48. The air cylinder 50 is pivotally supported at 52.

The cam 48 performs three functions, namely: first, to raise and lower the platen 4; second, to move the tray mechanism in and out; and, third, to move the belt 6 intermittently so as to bring freshly moistened portions thereof into operating position with each stroke of the machine. The first function of raising and lowering the lower platen 4 is accomplished through the cam roller 43 and lever 42.

The second function, that of moving the tray mechanism in and out, is accomplished through cam roller 53 carried on the lever 54. The lever 54 has an arm 56 extending to the other side of the fulcrum 55. By means of a spring link 57 pivotally connected to the arm 56 at 58, the motion of the arm 56 is transmitted to the arm 59. 59 is shown in cross-section in Figure 1 and in side view in Fig. 2. The arm 59 is mounted on a rock shaft 60. The levers 36 previously described are also mounted on said rock shaft 60. By this arrangement of links and levers, the motion of the cam roller 53 is transmitted to the tray mechanism through the transverse bar 34 attached to the tray mechanism.

The third function, that of moving the belts, is also accomplished by means of the cam roller 53 whose motion is transmitted by the rod 61 to the arm 62 (see Fig. 6) by means of the pivotal connection 63. Pivoted on the arm 62 is a pawl 64 which is pressed by means of spring 65 against the teeth of the ratchet 66 as best seen in Fig. 6. The ratchet 66 is keyed to the shaft 67 which is journaled in the cover 68 and also in the rear wall of the head 1 as shown in Fig. 4. Also keyed to the shaft 67 is the gear 69 which meshes with the pinion 70 mounted on shaft 71. This shaft also carries the gear 72 which in turn meshes with the pinion 73 carried by shaft 74 as shown in Fig. 6. Shaft 74 also carries the driving pulley 7 shown in Figure 1.

In order to transmit motion in the desired manner from the cam roller 53 to the rod 61, the rod 61 is provided at its lower end with a slotted portion 75 in which operates a pin 76. The pin 76 is carried on an arm 77, which arm 77 is keyed to the shaft 55, same as the arm 54. In this manner, motion is imparted to the pin 76 when the cam roller 53 moves upward. During the upward part of the stroke of the system pin 76 and rod 61, the pawl arm 62, as shown in Fig. 6, moves clockwise over the teeth of the ratchet 66 without imparting motion to said ratchet. In motion in the downward direction, however, the spring 78 pulls the rod 61 downward and through the ratchet operates the train of gears 69, 70, 72 and 73. In order to avoid unnecessarily high accelerations of the train of gears and of the belt which is driven by said train of gears, the pin 76 is free to return to its starting position by sliding down the slotted portion 75. Motion of the gear train and the belts is obtained by means of the spring 78 pulling on the rod 61 as shown in Fig. 1. The speed of movement of the belt is regulated by the tension of this spring and is not determined by the speed with which the cam roller 53 moves.

Power for operating the machine is furnished by compressed air acting through the air cylinders 46 and 50 controlled by the hand-operated valves 80 and 81, shown in Figs. 3 and 10, and automatic valve 82 (see Fig. 10), which is actuated by compressed air from a port indicated at 83 in cylinder 50, (see Figs. 1 and 10). The three valves 80, 81 and 82 are of similar construction shown in cross-section in Fig. 9. Referring to Fig. 9, compressed air enters at 84 and is normally prevented from going further by the valve disc 85 pressed against the valve seat 86 by spring 87. The cylinder 50 is connected to the valve at 88 and is normally open to the atmosphere because the valve disc 89 is kept off its seat 90 by the spring 87. The atmosphere has free access to the chamber 91. Compressed air may also enter through the pipe 92 into the chamber 93 and so force the piston 94 to operate the valve. The valve may also be operated by means of the arm 95 carried on the shaft 96, to which shaft a valve handle may be connected as shown at 97 or 98, in Fig. 3.

A circuit diagram showing the air connections is given in Fig. 10, which also includes a foot release valve 99, as will be explained. Referring to Fig. 10, the compressed air line is connected to the system at 101 and is piped to the valve 81. By depressing the handle 97, the compressed air is admitted to the pipe 102 and can get no further unless the handle 98 is also depressed. In this way, both of the operator's hands must be used to operate the system, as a safety feature. From valve 80 which is operated by the lever 98, air is fed to the pipe 102 and thence to the cylinder 50. When cylinder 50 has completed its stroke, approximately, it opens the port indicated at 83, in Fig. 1 and Fig. 10, and thereby supplies compressed air through pipes 103 and 104 to the chamber 93 (Fig. 9) in both valves 80 and 81, holding both of these valves in the open position. In other words, the piston 94 shown in Fig. 9 acts as a holding device on the valves 80 and 81 so that the operator does not have to keep his hands on the handles 97 and 98 after the piston of cylinder 50 has completed its stroke. From the port 83 air is also fed through the pipe 105 to the chamber 93 in valve 82. In this valve, the piston 94 acts as an operating piston and moves the valve into its operating position, thereby feeding compressed air through the pipe 106 to the pressure cylinder 46. In order to effect release of the valves and the restoration of the cylinders to their normal positions, the foot valve 99 is provided which permits the chamber 94 in each of the valves 80, 81 and 82 to discharge into the atmosphere through pipe 107. This operation merely shuts off the compressed air from each of the cylinders and opens them to the atmosphere. The actual return of the pistons is effected as follows:—spring 108 acting on cam 49 restores piston of cylinder 50, and spring 109 acting on lever 42 restores piston of cylinder 48 and also serves to keep the cam roller 43 in contact with the cam 48. Spring 110 acting on arm 56 serves to keep the cam roller 53 pressed against the cam, and at the same time serves to effect the return stroke of the tray mechanism. The compressed air control system is known in the art and is not claimed as part of this invention.

The operation of the machine is as follows:— when the tray mechanism is in the outward position as shown by the dotted lines in Fig. 4, the collar "A" or other garment part is laid smoothly on the tray mechanism as indicated in Fig. 5. The operator then depresses both the handles 97 and 98 which thereby feed compressed air to the cylinder 50. This cylinder rotates the cam 48. During the first part of the stroke, due to the relative positions of the cam rollers 53 and 43, the cam roller 53 is raised, while the cam roller 43 remains in its initial position. Raising of the cam roller 53 serves to move the tray mechanism to the inward position indicated by the full lines in Fig. 4, thereby carrying the work into the machine. At the same time, the rod 61 is moved upward, thereby increasing the tension on spring 78 and at the same time operating the pawl arm 62 so that everything is in readiness to move the belt on the return stroke. During the latter part of the motion of the cylinder 50 and the cam 48, cam roller 53 moves no further, but cam roller 43 is moved upward, carrying the rod 41 and with it the lower platen 4 into the upper position. By means of the adjustment shown at 40 the upper position of the lower platen 4 is set so that it just makes contact, or nearly makes contact with the upper platen 3, due allowance being made for the thickness of the belt and of the work. When the stroke of cylinder 50 is approximately completed, the port 83 is opened, thereby holding open valves 80 and 81 and also operating valve 82 which thereupon operates cylinder 46. This cylinder, acting through the lever 42, applies a definite known pressure on the lower platen 4, and therefore applies a definite predetermined pressure onto the work. After a specified interval of time, which usually is around ten seconds, the solvent has acted sufficiently on the work and the foot valve 99 is depressed. This releases the compressed air from both the cylinders and connects them to the atmosphere, as previously described, thereby permitting spring 109 to restore cylinder 46 and likewise spring 108 to restore cylinder 50.

By various devices, known to the art, speeds are regulated so that cylinder 46 is more quickly returned than cylinder 50. Mechanical or other interlocks may be provided if desired in a manner well known to the art, to insure the return of cylinder 46 before cylinder 50 has completed more than half its stroke. During the first part of the return of cylinder 50 and cam 48, cam roller 53 remains unmoved but cam roller 43 drops to its normal position, thereby restoring the platen 4 to its normal position. During the latter half of the return stroke of the cam, cam roller 53 drops to its lower position, being pressed against the cam by spring 110. This operates the tray mechanism on its outward stroke, as previously described, carrying the work out of the machine. At the same time, pin 76 drops to its normal position, thereby permitting spring 78 to pull down rod 61 which operates the gear train through the ratchet 66 and thereby moves the belt. Thus the belt presents surfaces freshly wetted with the solvent for the next stroke of the machine.

The mechanism heretofore described represents a power-operated press intended to provide maximum efficiency and output under factory operating conditions. Where the output is not large, however, or under other circumstances where the expense of the full power-operated mechanism would not be warranted, results can be achieved by means of a much simpler device which is diagrammatically illustrated in cross-section in Fig. 11. It is to be understood that only the head of the machine is shown in this figure.

Referring to Fig. 11, 121 represents a hollow casting with a well 122 running lengthwise along the rear of the casting and filled with solvent 123. 124 represents a flat steel plate running lengthwise of the machine and supported on the base of the machine by the lugs 125. Another flat plate 126 is slidably mounted in the head by means of a pair of rods 127 operating in bosses 128 (only one rod of the pair 127 and one boss 128 are shown in Fig. 11). Surrounding the plate 124 over upper and lower surfaces except at points of attachment is a padding 129 whose ends dip into the well 122 and are thereby wetted with the solvent 123. Similarly, plate 126 is surrounded by padding 130 which is also wetted with the solvent, as indicated. The front of the machine is closed by means of plate 131 carried by the cast frame 132. Plate 131 is provided with an elongated slot 133 through which the work is inserted into the machine. If desired, slot 133 may be kept closed by a suitable lid except when work is being put into or taken out of the machine.

In operation, this machine is substantially the same as the one previously described. The pads 129 and 130 are kept constantly wetted with the solvent by means of capillary flow. The height of the solvent 123 may be regulated in any manner known in the art and may be maintained at any desired level so as to insure free wetting of the pads. The collar or other article to be processed is inserted into the machine through the opening 133 and laid smoothly on the lower pad 129. By means of a toggle mechanism or other suitable device (not shown) the plates 124 and 126 are pressed together and maintained under pressure for the desired length of time. The pressure is then released and the work is taken out of the machine, and the next collar or other work is inserted.

In either type of machine, the amount of solvent which the collar or other work picks up is regulated in several ways. First, by varying the thickness of the paddings 129 and 130 in Fig. 11, or of the belt 6 in Fig. 1, the total amount of liquid solvent available can be varied. In the form shown in Fig. 11, the amount of liquid can be further varied by adjusting the level of the solvent 123. Finally, it is important to note that the amount of pressure applied determines the amount of solvent which the work picks up, because application of pressure squeezes the solvent out of the padding or belt immediately, so that the greater the pressure the less solvent remaining on the belt or padding and hence the less solvent available for the work to pick up. Adjustment of the pressure is therefore an important function in this machine, and it is on this account that in the form shown in Figs. 1 to 10, I do not use a toggle mechanism but a straight leverage operated by an air cylinder with compressed air under predetermined pressure. Slight variations in the adjustment of a toggle mechanism may cause large variations in pressure, which is avoided by the leverage system shown in the accompanying drawings.

It has been found in practice that best results are obtained by maintaining the work under mechanical pressure while it is moist with solvent. Our interpretation of this phenomenon is as follows:—adhesion being obtained by means of cellulose derivative yarns interwoven with the lining, which yarns lose their identity as yarns in the process, due to the action of the solvent, the strength of the adhesion will depend on the "hold" which the cellulose derivative has on the two outer plies. By maintaining pressure on the collar or other work during the interval when the cellulose derivative is softened and peptized, a certain amount of penetration of the cellulose derivative into the yarn of the outer plies is obtained. This penetration, although it cannot be allowed to proceed too far lest it affect the surface appearance of the work, nevertheless does insure a materially stronger adhesion than is obtainable without it.

The articles to be processed, such as the collars "A" or other garment parts, are allowed to remain in the press for the required length of time, usually about five to ten seconds, depending upon the nature of the fabric, and are then taken out and, while still damp with the solvent, inserted in a hot press whereby pressure and heat are applied to evaporate the solvent and to complete the adhesion of the plies.

I have herein explained the principles of my invention and the best mode in which I now contemplate applying the same, but I am aware that many alterations and modifications in the construction of the machine and the practice of the process may be made, or may suggest themselves to those skilled in the art, without departing from the spirit and scope of the invention.

What I claim is:—

1. In apparatus of the character described, a pair of oppositely disposed pressing members, means for effecting movement of said pressing members one with respect to the other, a work support comprising an open frame and means for holding the frame in fixed position during relative movement of the pressing members, a plurality of spaced work-supporting elements extending across the frame between the pressing members, said spaced elements being resilient to permit the same to be moved and carried by one of the pressing elements toward the other pressing element as the pressing elements are brought together in the pressing operation.

2. In apparatus of the character described, a pair of oppositely disposed pressing members, means for effecting movement of said pressing members one with respect to the other, a work support comprising an open frame and means for holding the frame in fixed position during relative movement of the pressing members, a plurality of spaced work-supporting elements resiliently mounted on the open frame to permit such elements to be moved by one of the pressing elements toward the other pressing element in the pressing operation.

3. In apparatus of the character described, a pair of oppositely disposed pressing members, a work support between the pressing members, a fabric below the work support and between the same and one of the pressing members and means for keeping the fabric wet with a liquid solvent, said work support being of open work design to permit application therethrough from the fabric below the same to the article upon the same of the solvent carried by the fabric.

4. In apparatus of the character described, a pair of oppositely disposed pressing members, a work support between the pressing members, a fabric below the work support and between the same and one of the pressing members and means for keeping the fabric wet with a liquid solvent, said work support being resilient and of open work design to permit application therethrough from the fabric below the same to the article upon the same of the solvent carried by the fabric and to permit the same to yield and be carried by one pressing member toward the other pressing member in the pressing operation.

5. In apparatus of the character described, a pair of oppositely disposed pressing members, a fabric between said pressing members, a source of liquid solvent for wetting the fabric and a housing enclosing the pressing members, fabric, and source of liquid solvent to prevent escape of fumes of the solvent.

6. In apparatus of the character described, a pair of oppositely disposed pressing members, a work support between said members, a fabric between the work support and one of the pressing members, a source of liquid solvent for keeping the fabric wet, a housing enclosing the pressing members, fabric, and source of liquid solvent, together with the work support when the parts are in position for pressing, said housing having an opening in one side thereof, and means for moving the work support through the opening between pressing operations to permit removal and placement of articles on the work support.

7. In apparatus of the character described, a pair of oppositely disposed pressing members, a work support between said members, a fabric between the work support and one of the pressing members, a source of liquid volatile solvent for keeping the fabric wet, a housing enclosing the pressing members, fabric, and source of liquid solvent, together with the work support when the parts are in position for pressing, said housing having an opening in one side thereof, and means for moving the work support through the opening between pressing operations to permit removal and placement of articles on the work support, the work support having means thereon for closing the opening against escape of fumes therethrough when the work support is in position for removal and placement of articles.

BENJAMIN LIEBOWITZ.